United States Patent [19]

Cornelison

[11] Patent Number: 5,026,273
[45] Date of Patent: Jun. 25, 1991

[54] HIGH TEMPERATURE COMBUSTER
[75] Inventor: Richard C. Cornelison, Hiram, Ohio
[73] Assignee: W. R. Grace & Co. -Conn., New York, N.Y.
[21] Appl. No.: 219,261
[22] Filed: Jul. 15, 1988
[51] Int. Cl.⁵ .......................................... F23D 21/00
[52] U.S. Cl. .................................... 431/170; 431/328; 431/329; 502/525; 502/527; 422/180; 60/723
[58] Field of Search ................ 502/334, 87, 439, 527, 502/525, 333; 60/39, 822, 723, 299, 301; 431/328, 329, 354; 422/180

[56] References Cited
U.S. PATENT DOCUMENTS

| | | | |
|---|---|---|---|
| 2,811,490 | 10/1957 | Sherwood | 502/527 X |
| 2,887,456 | 5/1959 | Halford et al. | 502/527 X |
| 3,846,979 | 11/1974 | Pfefferle | 60/39.04 |
| 3,867,313 | 2/1975 | Brewer | 502/527 X |
| 3,928,961 | 12/1975 | Pfefferle | 60/39.02 |
| 3,940,923 | 3/1976 | Pfefferle | 60/39.06 |
| 3,975,900 | 8/1976 | Pfefferle | 60/39.06 |
| 3,992,330 | 11/1976 | Noakes et al. | 502/527 X |
| 4,019,316 | 4/1977 | Pfefferle | 60/39.02 |
| 4,072,007 | 2/1978 | Sansday | 60/723 |
| 4,094,142 | 6/1978 | Pfefferle | 60/39.03 |
| 4,098,722 | 7/1978 | Cairnes et al. | 502/527 X |
| 4,119,701 | 10/1978 | Fedon et al. | 502/527 X |
| 4,154,568 | 5/1979 | Kendall et al. | 431/7 |
| 4,196,099 | 4/1980 | Hunter et al. | 502/527 X |
| 4,233,183 | 11/1980 | Insaba et al. | 502/527 X |
| 4,252,690 | 2/1981 | Kamiya et al. | 502/537 X |
| 4,276,203 | 6/1981 | Pfefferle | 252/462 |
| 4,287,090 | 9/1981 | Pfefferle | 252/462 |
| 4,295,818 | 10/1981 | Angwin et al. | 431/7 |
| 4,337,028 | 6/1982 | Angwin et al. | 431/7 |

FOREIGN PATENT DOCUMENTS 2072036  3/1984  United Kingdom ............ 252/462

OTHER PUBLICATIONS
4,711,009 Dated 12/8/87–Cornelison et al. C1 29–157R.

Primary Examiner—Carl D. Price
Attorney, Agent, or Firm—Edward J. Cabic

[57] ABSTRACT

There has thus been provided a highly efficient metal-ceramic catalytic combustor for a gas turbine/catalytic combustor assembly. The catalyst zone is formed of a high temperature resistant metal wire mesh, e.g., palladium coated tungsten or ferritic stainless steel screen, e.g., 40 mesh, which is aluminized with metallic aluminum, and heated to convert the outermost layer of aluminum to aluminum oxide and encourage the diffusion of the inner layer of aluminum into the body of the metal wire, desirably forming a thin metal/aluminum alloy layer. The outer surface because of the Kerkendall Effect is porous and readily accepts and strongly bonds to a metal oxide coat, e.g., a magnesia/alumina, or magnesia/alumina/yttria, or barium oxide/alumina, or barium oxide/alumina/yttria wash coat. There may also be included a catalyst deposited on the ceramic outer coat, e.g., a noble metal catalyst, for enhancement of the combustion of an air/fuel mixture. Because the metals from which the wire mesh is formed all have melting points above the maximum temperature of operation, i.e., 2700° F., the screen itself has significant tensile strength at temperature.

10 Claims, 4 Drawing Sheets

HIGH TEMPERATURE COMBUSTER

This invention relates to a high temperature combustor, and more particularly to a catalytic combustor characterized by a novel specially constructed honeycomb catalyst support especially useful in conjunction with gas, e.g., natural gas and oil fired turbines to control gas phase combustion without the formation of thermally generated nitric oxides.

BACKGROUND OF THE INVENTION AND PRIOR ART

Gas turbines have been utilized for some time as cost effective and efficient means for generation of electric power and steam. However, the temperatures at which turbines are operated produce unacceptably high amounts of nitrogen oxides ($NO_x$). During the early seventies, efforts were made to annex catalytic combustors to gas turbines for the purpose of preventing $NO_x$ formation in the combustion process.

Efficient, modern turbines must operate at about 2500° F. and up to as high as 2700° F. for good thermal efficiency. At these temperatures, most metallic catalytic support materials are subject to weakening by grain growth, oxidation, cyclic failure, creep and loss of tensile strength. Ceramic catalytic support materials at high temperatures are brittle, undergo fracture propagation, and fragmentation. In large gas turbines used for electric power generation, the combustor element must have a diameter of about 21 inches. Under the conditions of operation, the catalyst support or honeycomb must not shatter or break loose.

P. W. Pillsbury et al in 1982 issued a report under the auspices of the Electric Power Research Institute, Report No. AP-2584, prepared by Westinghouse Electric Corp., Condorville, PA. Copies of this report are available from the Research Report Center, P.O. Box 50490, Palo Alto, CA 94303. This report deals with the effort to utilize a catalytic combustor in conjunction with a gas turbine. The combustor utilized ceramic monolith elements that were cemented together and comprised a 16" diameter combustor.

Commercially available ceramic monolith elements are cast or extruded with a cell density of 50 to 200 cells per square inch. The catalytic materials adhere to the walls of the ceramic and are typically applied by a process of dipping, in an aqueous solution, followed by calcining. Such catalytic ceramic honeycomb monoliths have been successfully used for periods of a few hours to reduce $NO_x$ to within the limits prescribed by the U.S. Environmental Protection Agency and the South Coast Air Quality Management District in Los Angeles. However, the ceramic support has proved to be fragile because of its relatively low toughness, low thermal conductivity, and low tensile strength in the face of the high temperature gradients throughout the combustor, especially during start up. At turbine start up, the temperature of the monolith can be elevated from normal outdoor temperature to over 2000° F. within a few seconds.

Moreover, combustors made of ceramic have exhibited backflashing in which the air-fuel mixture in the fuel mixing chamber upstream of the combustor ignites, often with disastrous effects on the turbine system. Ceramic honeycomb cores have an area of approximately 70% open to the transmission of infrared energy. In the case of ceramic combustors, infrared heat energy travels in a straight line upstream through the tubular cells that are characteristic of a ceramic honeycomb. The result of this direct path of high temperature energy is that towards the upstream end of the combustor there exists an apparent temperature nearly as high as that of the combustion chamber, and sufficient to ignite the fuel. This explains why backflashing has been a problem with ceramic combustors.

The cell walls of such ceramic monoliths are from 0.006-0.025 inch thick. The individual monolith modules are typically 4 inches wide by 7 inches high with a depth as dictated by the combustor design. Typically, such depths are 8-12 inches. In order to make a large, homogeneous monolith for a combustor, the ceramic modules are cut to size on a diamond wheel and cemented together. The wall thickness is at least doubled along the seams where the blocks are cemented. When gases rush through the ceramic monolith at space velocities on the order of 1,000,000 volume/volume/hour, eddies are created at the entrance and exit of the catalytic chamber. The seams cause eddies and uneven flow which can induce backflashing from the hotter combustion zone through the catalytic converter and into the fuel mixing chamber, thus igniting the gaseous mixture of fuel and air in the fuel mixing chamber.

The present invention, on the other hand, utilizes mixed flow honeycomb cells characterized by a nonlinear flow path and which, by reason thereof, are opaque to infrared radiation while at the same time providing a relatively low pressure drop, diffusing conduit for the combustion gases as they traverse the combustor. Mixed flow honeycomb cells are cells which provide a tortuous path for the gas to traverse.

Reference may be had to Pfefferle's U.S. Pat. No. 3,846,979 dated Nov. 12, 1974; U.S. Pat. No. 3,928,961 dated Dec. 30, 1975; U.S. Pat. No. 3,940,923 dated Mar. 2, 1976; U.S. Pat. No. 3,975,900 dated Aug. 24, 1976; U.S. Pat. No. 4,019,316 dated Apr. 26, 1977; U.S. Pat. No. 4,094,142 dated June 13, 1978; and various catalytic systems and methods of making them as described in U.S. Pat. No. 4,276,203 dated June 30, 1981; U.S. Pat. No. 4,287,090 dated Sept. 1, 1981; U.S. Pat. No. 4,276,203 dated June 30, 1981; U.S. Pat. No. 4,295,818 dated Oct. 20, 1981; and U.S. Pat. No. 4,337,028 dated June 29, 1982. Up to this time, mainly extruded ceramic material impregnated with a suitable catalyst has been used for combustors.

Reference may also be had to U.S. Pat. No. 4,154,568 dated May 15, 1979 to Kendall et al which describes a catalytic combustor which includes a monolith bed through which a mixture of oxidant and fuel is directed and characterized by cells of optimum size for heterogeneous combustion and cells of smaller size downstream to obtain substantially complete combustion in a relatively compact bed. This has some tendency to opacity to infrared energy transmission.

There are currently no iron-based or nickel-based alloys that have been shown to withstand the combustor environment for prolonged service. Furthermore, many stationary turbine installations are required to demonstrate operation for at least about 15% of their life cycle with fuel oil which has sulfur concentrations ranging up to 60 ppm of $SO_2$ in the exhaust stream. Sulfur dioxide, in the presence of oxygen, is a powerful oxidizer for metals at high temperatures.

Some attempts in the past to find suitable materials and practical methods of construction for combustors for gas turbine service are described in the foregoing patent literature.

The lack of suitable high temperature materials and a means for processing them on a large scale basis into suitable monolithic honeycomb cores has for some time been a fundamental obstacle in combustor technology for gas turbines. Catalytic combustors are generally recognized as the preferred means of eliminating thermal $NO_x$ because peak temperatures in the combustion chamber can be maintained at less than 3000° F., above which thermal $NO_x$ is generated.

The program to develop a suitable combustor has become more urgent in view of the need to reduce $NO_x$ emissions from an increasingly large number of gas turbine power plants, and the relatively high cost of $NO_x$ reduction by means of selective catalytic reduction (SCR) and/or steam injection.

Power generation utilizing gas turbines has recently moved into center stage mainly because of (1) the favorable economics of gas turbine power plants relative to nuclear power and coal power plants, (2) the abundant supply of reasonably priced natural gas, and (3) the favorable field experience associated with over 800 land-based gas turbines in service for a number of years.

At the same time, in a number of states, $NO_x$ emissions from gas turbines are tightly controlled at 42 ppm maximum and in California at 9 ppm maximum. Low $NO_x$ limits are important because $NO_x$ combines with volatile organic compound emissions to form ozone. Ozone in the troposphere and especially in intermountain valleys, such as in the Los Angeles Basin and Mexico City, damages living matter. $NO_x$ is also indirectly responsible for acid rain in the Western United States, the toxic effects of which have been well documented.

It is a principal object of this invention to provide a catalyst member for use in such gas turbine catalytic combustors which is opaque to infrared radiation and highly permeable to the flow of an air/fuel mixture.

It is a further object of this invention to provide a catalytic member for use in such gas turbine catalytic combustors which is structurally stable and able to withstand the high temperatures necessary to operate the device efficiently, i.e., up to about 2700° F.

It is still a further object of this invention to provide a device easily amenable to mass production and of lower cost than existing $NO_x$ control systems.

Other objects will appear as the description proceeds.

BRIEF STATEMENT OF THE INVENTION

Briefly stated, the present invention is a high temperature (2300°-2700° F.) honeycomb catalyst support for use in conjunction with gas or oil fired turbines, said catalyst support being characterized by a permeable metallic mesh, preferably a high melting point metal or refractory metal, made resistant to oxidation, said mesh being nonlinearly corrugated and coated with one or more refractory metal oxides, and having high temperature resistant catalyst metal supported on the surface thereof, said catalyst being active to promote combustion of an air/fuel mixture. The present invention also contemplates a catalytic combustor for combusting air/fuel mixtures in power plants and having a housing, a primary fuel mixing zone, and a catalytic combustor zone in axially spaced relation to said mixing zone within said housing, said catalytic combustor being characterized by a catalyst support member disposed in air/fuel mixture-intercepting relation in said combustor and comprising layers of nonlinearly corrugated high temperature and oxidation resistant metal oxide coated expanded metal or metal wire screen in the form of a honeycomb which is opaque to infrared and having a catalyst supported on said metal oxide, said catalyst being active to combust fuel to yield environmentally acceptable exhaust materials. Screen made of palladium or other metals in the platinum group will withstand temperatures encountered in the combustor because their melting points are well above 2600° F. and they are highly resistant to oxidation. The mesh is flexible and not subject to shattering on impact as is ceramic. As indicated, the screen of expanded metal or wire cloth is corrugated in accordance herewith, aluminized, stress relieved, oxidized and coated with a wash coat and/or plasma applied coating of ceramic or cermet, a catalyst, and then layered in the form of a series of nonnesting layers, either as individual strips laid one on top of the next, or accordion folded in a zig-zag manner to provide a geometric configuration corresponding to the cross-section of the combustor portion. Usually the periphery is circular because of the turbine configuration.

Other high temperature material from which to make wire mesh includes the refractory metals, with melting points of from about 3450°-6150° F. Useful metals include tungsten, niobium, molybdenum, tantalum and other metals, with high melting point metals, e.g., metals which have been coated with a platinum group metal, for example palladium, to improve resistance to oxidation. Although palladium coated ferritic stainless steel is not strictly a refractory metal, being an alloy of iron, chromium and aluminum, its melting point is about 2600° F. which makes it suitable for purposes of this invention and it will, therefore, be included among the "refractory metals" useful herein. However, the phenomenon of grain growth occurs in the ferritic stainless steel wire of very fine diameter (e.g., 0.005") so that the life of a screen formed therefrom is limited to less than about 500 hours at 2500° F.

The wire used to make wire cloth or screen is desirably coated with a noble metal such as, platinum, palladium, rhodium, or combinations thereof. Alternatively, a mesh or web of expanded metal may be similarly coated with a noble metal. The wire has a diameter of from 0.001" to 0.010" and when woven into a wire cloth or screen has a mesh size of from about 20 to 200 wires per lineal inch. It is corrugated desirably by passing between intermeshing corrugation rolls to provide corrugations having a pitch of from about 0.02" to about 0.2" and an amplitude of from about 0.05" to about 0.25". The weave can be of any convenient pattern, although a simple weave of over and under for both warp and woof wires is completely satisfactory.

The corrugations may have any configuration as long as the resulting honeycomb is opaque to infrared. Thus, the pattern of the corrugations may be chevron, or modified chevron where the apices are merely rounded off to relieve stress. The wave pattern may be sinusoidal, semicircular wave, triangular wave, etc. The critical consideration is that whatever the wave form and pattern of corrugations, there must not be a straight, or line-of-sight path from the high temperature zone in the catalytic combustor upstream to the fuel mixing zone so that infrared energy radiation cannot pass from the catalytic combustor zone to the fuel mixing zone and cause premature ignition of the fuel, or backflash.

The refractory metal oxide coating, e.g. alumina, may have deposited thereon a suitable catalyst e.g., a noble metal such as palladium, platinum, rhodium, thorium or a combination of any two or more thereof. Alternatively, the metal oxide coating may be catalytic in an of itself. For examples of such, reference may be had to British Patent 2,072,036 to Pfefferle, and to the book entitled "Ceramic Containing Systems" (Mechanical Aspects of Interfaces and Surfaces) by A. G. Evans, Noyes Publication 1986..

BRIEF DESCRIPTION OF THE DRAWINGS

The invention may be better understood by having reference to the annexed drawings which are illustrative of preferred embodiments of the invention as compared to the prior art, and wherein.

DETAILED DESCRIPTION OF THE INVENTION

Basically, there are three ways to make a porous metal web of expanded metal or wire cloth on which to coat ceramic material and catalyst material and from which to make a metal-ceramic composite for use in a combustion honeycomb. These are:

1) To use palladium metal as the sole metal.

2) To use a refractory metal, such as tungsten, molybdenum, niobium as a wire cloth or screen, or as an expanded metal mesh, coated with palladium, or other noble metal.

3) To use ferritic stainless steel (15–22% chromium, 3–8% aluminum, less than 1% by wt. cerium or yttrium) coated with palladium or other noble metal.

Figure 6:
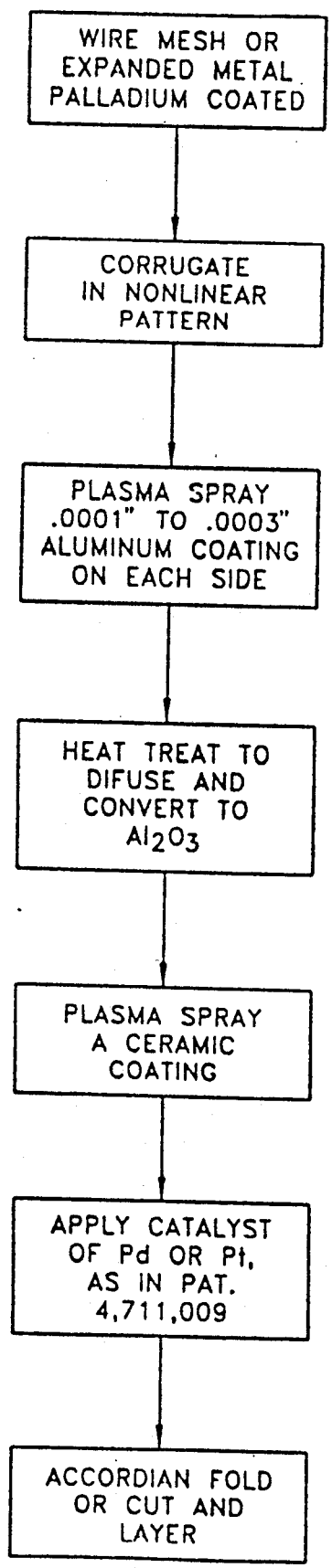
FIG. 6 is a diagrammatic and schematic flow sheet showing the steps involved in making a catalyst support member in accordance herewith.

These foundation metal compositions are treated according to the process diagrammed in FIG. 6, certain steps of which are fully described in U.S. Pat. No. 4,711,009 dated Dec. 8, 1987 which patent is incorporated herein by reference thereto. The use of pure palladium wire produces the best substrate for a catalyst in a combustor, but it is too expensive. While the use of refractory metals provides a material which does not melt until a temperature of at least 3500° F. is achieved, there is the problem of rapid oxidation of the refractory metals above 1800° F., although the problem can be largely alleviated by coating with a thin (0.000010–0.000015") layer of a noble metal such as palladium. Accordingly, the preferred stainless steel substrate for use herein is a ferritic stainless steel as above described coated with a thin coating of palladium to inhibit oxidation. This foundation metal substrate is then coated with aluminum (as by diffusion coating) to a thickness of 0.00005 to 0.00001 inch on each side, and then processed as shown in FIG. 6. The preferred refractory metal for use in accordance herewith is tungsten which has been palladium coated to inhibit oxidation. The above-mentioned metals (without the noble metal coating) can be obtained commercially as wire screen or expanded metal mesh. The balance of the discussion will be concerned primarily with the palladium coated refractory metal type substrate, or item 2 above.

As indicated above, the present invention is in a catalyst support and a fuel type combustor including the novel catalyst support hereof. These combustor systems are especially adapted to serve in the feed system for a gas turbine rotor and generator set such as fully described by Pfefferle in the references cited above. The principal difference between the Pfefferle catalytic combustor and the present catalytic combustor is in the catalyst support. Pfefferle used a ceramic support with "line-of-sight" straight-through tubes, whereas the catalyst support of this invention is formed of a refractory metal wire screen or mesh which has been coated, corrugated and layered in such a way as to provide a non-linear, or mixed flow, path for the air/fuel gases to traverse.

Layering of the corrugated wire mesh can be achieved either by accordion folding a continuous strip of corrugated and coated wire mesh (screen or expanded metal) back and forth upon itself with varying chordal lengths to accommodate the circular configuration of the unit (see FIG. 4), or by laying up individual precut chordal lengths, one on top of the other in a nonnesting manner until a suitable honeycomb filler for the circular cross-section is obtained. The nonnesting manner is achieved by reversing the contacting side of every other layer, i.e, the top of one layer contacts the bottom of the next, "top" and "bottom" referring to the sides of the strip a it leaves the process of coating and prior to cutting to predetermined lengths.

The axial dimension of the catalyst zone is generally between two and ten inches, e.g. 6". With the preferred corrugated and coated metal wire screen, axial lengths of as little as 2" will achieve opacity to the transmission of infrared light.

As indicated previously, the noble metal coated wire mesh desirably has an aluminum/aluminum oxide coating on the surface thereof tightly adhered thereto. The subsequently applied refractory metal oxide coating can be any suitable refractory metal oxide or multiple metal oxide. Suitable examples include alpha-alumina, gamma-alumina, magnesium oxide, mixed aluminum oxide/magnesium oxide, zirconia, berrylia, mixed aluminum/magnesium/silicon oxides, mixed barium/aluminum oxides, barium aluminum/yttrium oxides, titania, thoria, cordierite, which is $2MgO-2Al_2O_3-5SiO_2$, molybdenum oxides, and the like.

The refractory metal oxide may be applied by plasma spray or by wash coat, preferably applied by spray. The aluminum oxide of choice for a wash coat application is gamma-alumina. Gamma-alumina converts to alpha alumina at temperatures above about 1800° F. to 2000° F. In the catalytic combustors hereof, there is a temperature gradient of from about 650° F. on the upstream side to about 2700° F. at the exit from the combustor. Hence, if gamma-alumina is used in a wash coat, the lower temperature part of the catalytic combustor unit will remain gamma-alumina, and the balance will become alpha-alumina, formed at temperature in situ. Where alpha-alumina is applied initially, as by plasma spray, the refractory metal oxide (alumina) will remain entirely in the alpha form.

The particular oxide selected will depend upon the ultimate use of the gas turbine, whether stationary for electrical energy generation, automotive, as in automotive vehicles, or aircraft or marine. Each may require different fuel and catalyst and operate at a different temperature. The structures described and shown herein have particular utility in stationary gas turbine-catalytic combustor units useful in the generation of electric power either as a primary source or as an auxiliary source for accommodating peak loads.

One commonly used refractory metal oxide is known as "perovskite" and is a magnesium/aluminum oxide. Yttrium oxide in amount up to 5% can be added as a stabilizer.

In a preferred embodiment of my invention, the metal wire screen is formed from a palladium coated tungsten wire desirably having a diameter of from 0.002 to 0.005" and 100 wires to the inch, and corrugated by passing between corrugating rolls to provide a desired corrugation pattern, such as herringbone or chevron, or sinusoidal. This prevents nesting when the corrugated screen is accordion folded, or properly layered as precut lengths. The corrugated screen strip is desirably etched to roughen the surface of the wire cloth which is then diffusion coated using conventional techniques with aluminum metal to a coating thickness corresponding to about 5% to 10% aluminum by volume and the balance tungsten. The strip is then stress relieved or annealed by heating in an oven to a temperature of about 1600° F. for a residence time of about 1 to 5 minutes during which period aluminum oxide forms on the surface and aluminum metal diffuses into the metal substrate forming a "skin" of aluminum/refractory metal alloy, e.g., aluminum/tungsten alloy. The surface of the aluminum coated substrate becomes porous due to a phenomenon known as the Kerkendall Effect. This surface provides an exceptionally good surface for adhesion of ceramic coatings because the aluminum oxide is integrally bonded to the refractory metal substrate.

One or more layers of refractory metal oxide may then be applied, for example as a wash coat, dried by heating to from 300° F. to 800° F., and then calcined to a temperature of from about 800° F. to 950° F.

A wash coat is prepared by forming an aqueous dispersion (10% to 50% solids) of finely divided refractory metal oxide (325 mesh). The wash coat may contain other ingredients, such as suspension stabilizers, if desired. The coating is applied by spraying followed by removal of any excess. Instead of the method of preparing the wash coat as described above, the methods described in British Patent 2,072,036, supra., may be employed. When a suitable wash coat has been applied, it will be from 0.005" to 0.003" thick and may or may not fill the mesh of the wire screen. Alternatively, the refractory metal oxide coating may be applied by plasma spray.

Figure 3:
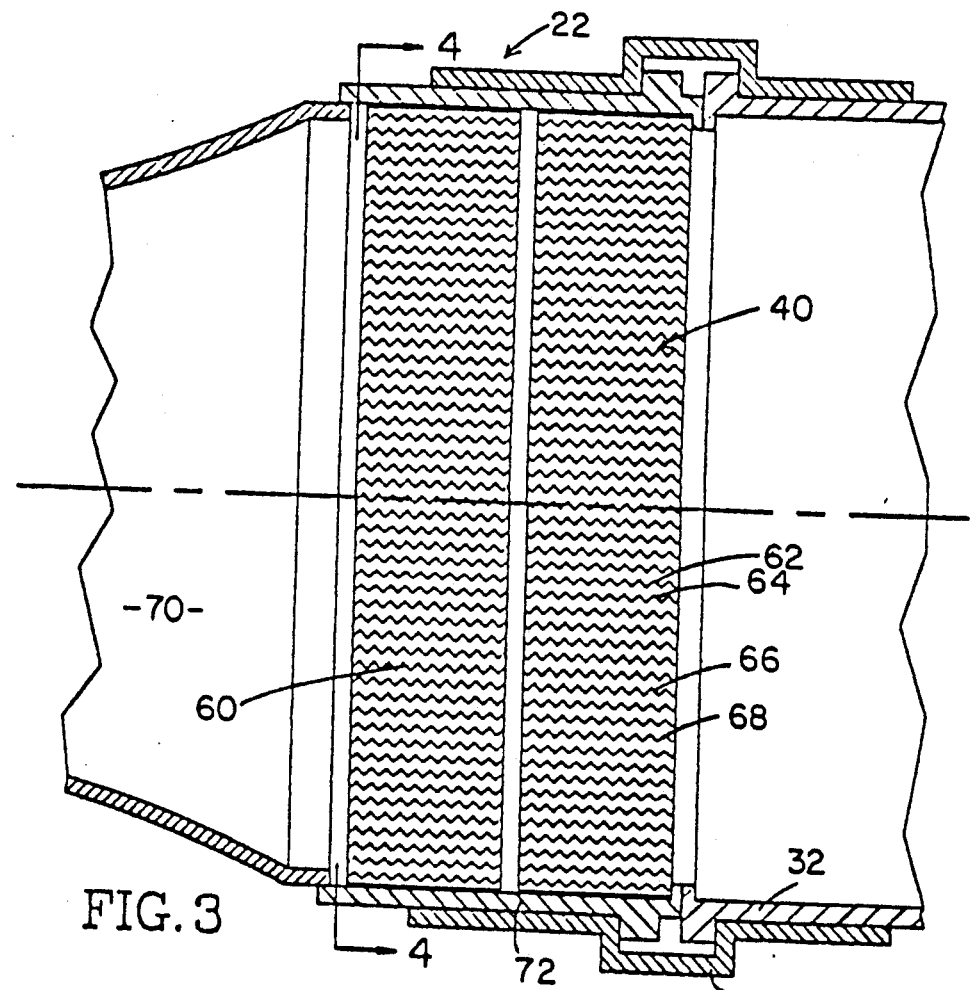
FIG. 3 shows a fragmentary cross-section of a catalytic combustor of the present invention on an enlarged scale.

If a catalyst is to be applied, such as a noble metal, e.g., platinum, palladium, rhodium, or a mixture of 2 or more thereof, this can be applied by plasma spray, diffusion coating, or by spraying on an aqueous solution of ammonium salts of the noble metal. The strip is then passed into one or more ovens in sequence to elevate the temperature to dry the surface at 200° F. to 300° F. followed by elevation of the temperature to the decomposition temperature of the metal salt utilized, e.g., a temperature of from 600° F. to 900° F. to liberate the catalytic metal or metals and strongly adhere them to the metal oxide coated surface. The coated corrugated refractory metal screen is then scored for accordion folding according to a predetermined pattern, e.g., a circular configuration, as determined by a computer in the manner described by the aforesaid application patent No. 4,711,009 supra. In the present process, the strip, because of its ceramic coating, is desirably treated in a straight line rather than being reaved over and under pulleys. The resulting core is contained in a suitable encircling ring (e.g., the ring 72 as shown in FIG. 3). The device is then ready for insertion into the combustor zone 40 (FIG. 3).

The ceramic or cermet coating protects the wire from the onrushing flow of the air/fuel mixture. The metal filaments serve to provide an underlying framework with sufficient tensile strength to inhibit structural failure in the ceramic in the face of the large temperature gradients and from vibration in the combustor. The internal metal structure in the corrugated web and the ceramic coating are selected such that the respective coefficients of thermal expansion are in relatively close proximity.

Figure 2:
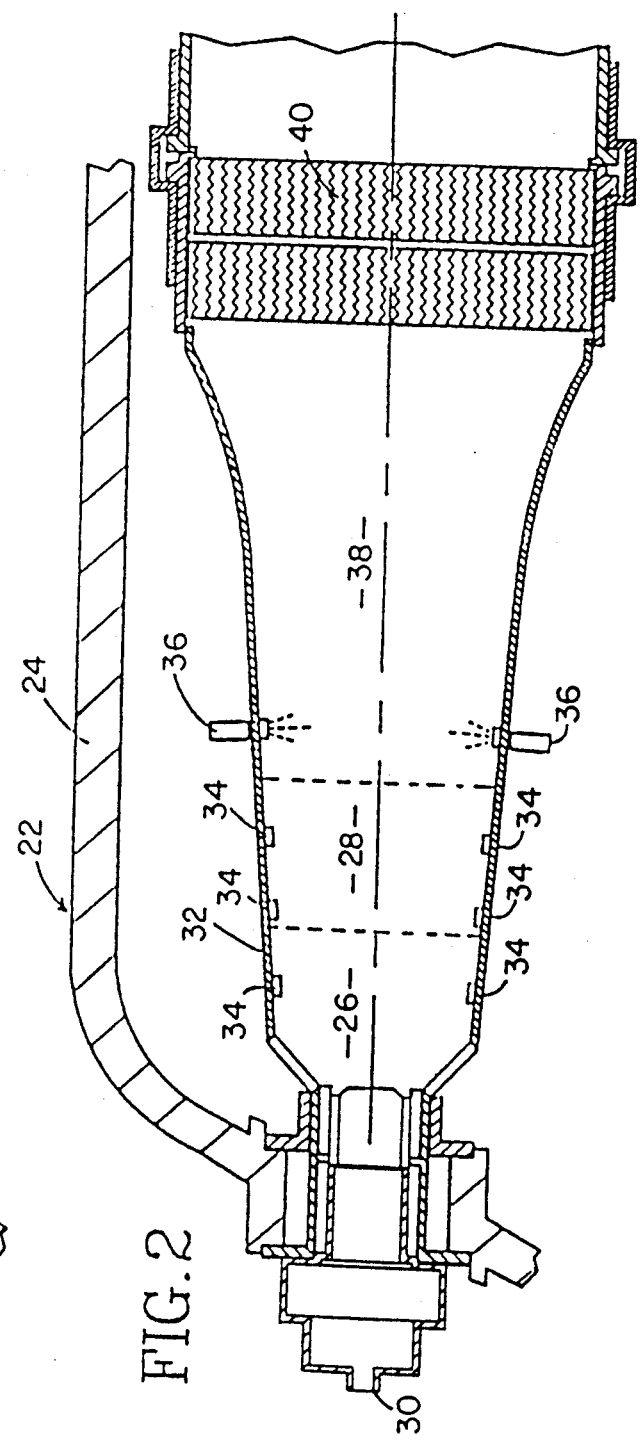
FIG. 2 is a cross-sectional view of the combustor of FIG. 1 which has been modified by the inclusion therein of a catalytic combustor zone in accordance with the present invention.

The collection of layered corrugated ceramic and catalyst coated wire screen members are then inserted in a suitable retaining ring typically made of a nickel stainless steel composition, dimensioned to fit within the combustor body such as shown in FIG. 2. When the unit is viewed along the axis, it is opaque to light but has a free gas permeable area of from at least about 70% to as much as 92%. It is in this zone that the air/fuel mixture (as distinct from the base metal) reaches its maximum temperature of about 2700° F.

The advantages are achieved in the nature of the catalyst core formed of layers of oxide coated wire mesh. Vibration does not damage the core, and the core is able to withstand the high temperatures without damage. Moreover, "backflash" is minimized due to the opacity of the unit to infrared light.

With respect to ferritic stainless steel, expanded ferritic stainless steel foil is less attractive than the corresponding wire cloth for this application because (1) the wire cloth can be readily pattern corrugated without inducing lateral and longitudinal stresses (this is because the wire cloth, by its nature, does not have lateral and transverse internal stresses, due to freedom of movement of the individual strands when being pattern-corrugated) and (2) the wire cloth presents an ideal means of bonding the wash coat to the metal, since the wash coat not only adheres to the prepared metal surface but also is attracted, when applied as a liquid, or when plasma sprayed, because of liquid tension on all four sides of the small cells formed between adjacent strands in the wire cloth.

Noble metal coated molybdenum, niobium, tantalum or ferritic stainless steel metal, as an expanded foil or as a wire screen, may be substituted for the palladium coated tungsten.

The invention will be better understood by having reference to the following description in conjunction with the drawings.

Figure 1:
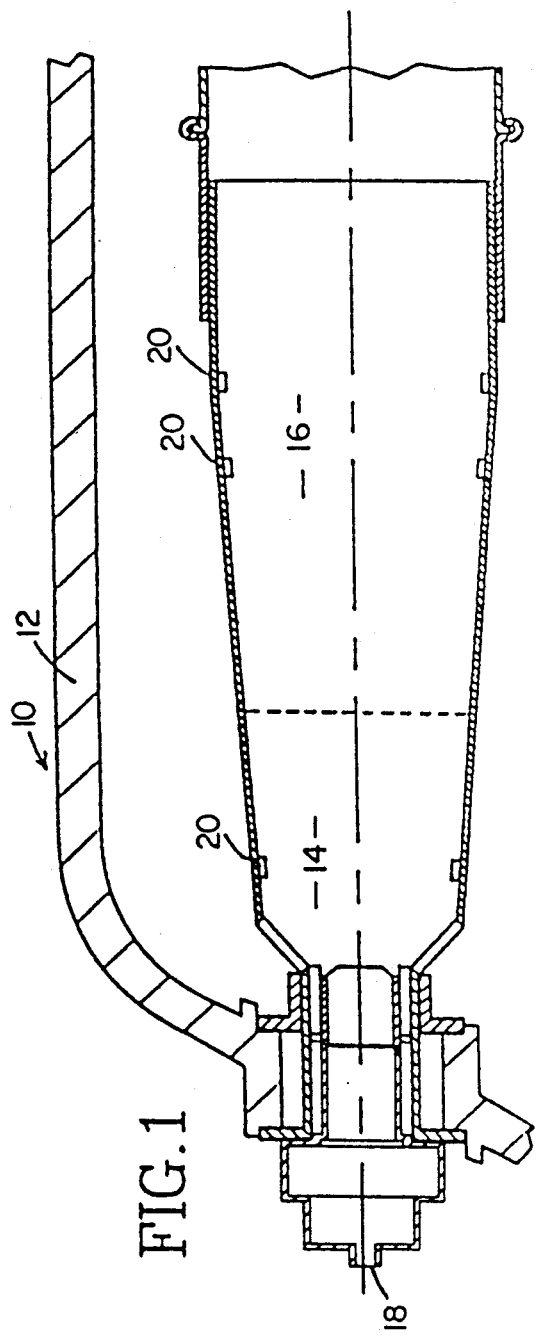
FIG. 1 is a cross-sectional view of a fuel combustor representative of the prior art.

FIG. 1 shows in cross-section a conventional or prior art combustor 10. This combustor includes a housing 12, a primary combustion zone 14 and a dilution zone 16. Fuel is introduced into the combustor through a nozzle 18 and into the primary combustion zone 14. Air inlets, such as inlet 20, admit preheated air into the primary combustion zone 14 and the dilution zone 16. This raises the temperature of the gases to from about 1000° F. to 2700° F. before it enters the turbine (not shown).

FIG. 2 shows in cross-section a catalytic combustor 22 in accordance with the present invention. In the manner shown in FIG. 1, the combustor 22 is provided with a housing or casing 24, desirably made of a nickel alloy, e.g. Alloy 430, a product of Cabot Corp. The combustor 22 is frustoconical and has half-angle of about 10°, and is provided with a primary mixing zone 26 and a primary dilution zone 28. Primary fuel is introduced through a suitable nozzle 30 into the primary mixing zone 26. Preheated air is introduced through the sides of the chamber 32 through air inlets 34. The air is preheated to within the range of 100° F. to 700° F. and mixes with the fuel in the primary dilution zone 28. There is provided a secondary fuel inlet 36 into the chamber 32. The zone 38 is a secondary fuel/air preparation zone to prepare the fuel air mixture for entry into the catalyst zone 40. The temperature of the gases approaching the catalyst zone 40 is in the range of from 650° F. to 1700° F. In the catalyst combustion zone 40, combustion is vigorous and the temperature increases to from 1800° F. to as high as 2700° F. before entry into the turbine. Under these conditions, the amount of $NO_x$ formed is below the 42 ppm allowed by the EPA. $NO_x$ forms at temperatures above 3000° F. With the combustor in use, thermal $NO_x$ is eliminated, for all practical purposes, leaving only fuel bound nitrogen as a source for $NO_x$ emissions.

The design of the secondary fuel preparation zone 28 in any catalytic concept must be arranged so that neither auto-ignition nor flashback occurs in the unburned fuel/air mixture approaching the catalyst zone 40. Auto-ignition occurs when the residence time of the mixture is so lengthy at the elevated pressure and temperature upstream of the catalyst zone 40 that the vapors spontaneously ignite. Flashback occurs when the mixture velocity becomes low enough in some region (possibly near a wall) so that a flame front can propagate upstream from an ignition source; the glowing downstream end of the combustor is an example of an ignition source. The problem with both phenomena is the projection of high temperatures on the side of the combustor which faces the mixing chamber and comes in contact with a chemically active mixture.

To protect the combustor unit, flashback must not occur in the catalyst combustor 40 leading to the fuel preparation zone. Since bulk flow velocities will be high—about 80 fps (24.4 m/s) with a 16-inch diameter combustor and about 100 fps (30.5 m/s) with a 14-inch diameter combustor, flashback in the central portion of the combustor is unlikely. If flashback does occur, it apparently creeps upstream in a boundary layer or where the air flow has separated from the combustor wall.

Figure 4:
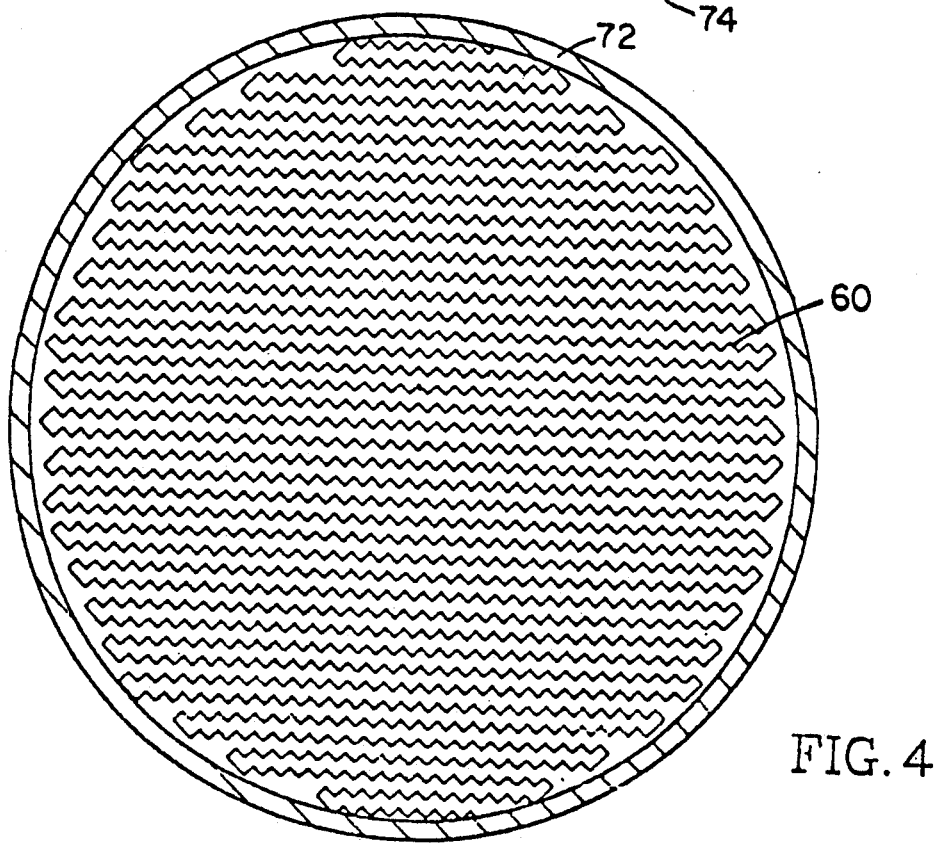
FIG. 4 is a cross-section of the catalyst sector shown in FIG. 3 as it appears in the plane indicated by the line 4—4 in FIG. 3.

The catalytic combustor unit 40 is shown in greater detail in FIG. 3. Instead of being formed of a cast ceramic monolith as in the past, the catalyst unit in the present invention is preferably formed of a corrugated screen of tungsten wire coated with palladium having from 15 to 200 wires per lineal inch uniformly spaced and as illustrated in FIG. 4. As indicated above, the process described in U.S. Pat. No. 4,711,009, supra, is the process of choice for forming and coating the wire screen. The corrugations impressed in the screen are conveniently formed by corrugation rolls capable of impressing a chevron or herringbone corrugation pattern. The corrugations have a pitch of from about 0.02" to about 0.2" and an amplitude of from about 0.05" to about 0.25".

The coating 54 is shown in partial diagrammatic form completely blinding the screen 52. As above indicated, the coating 54 need not completely blind the screen and may merely coat the individual wires 56, or a combination of both types of coating. The mode of application of the coating 54 to the screen 52 has been detailed above and need not be repeated here.

FIG. 3 is a fragmentary cross-sectional view of the catalytic combustor of FIG. 2 on an enlarged scale, showing the catalytic zone 40. This zone is built up of a pair of corrugated tungsten wire mesh sections 60 and 62 each formed of a plurality of layers, e.g., layers 64, 66 and 68 in the horizontal mode as shown in FIG. 3. When herringbone corrugated mesh layers, e.g., layers 64, 66, and 68 are disposed as shown, the hot gases from combustion zone 38 flow through the catalytic zone 40 between the layers, if blinded, and through and around the meshes (e.g., meshes 50 in FIG. 4) if open, following a tortuous path created by the chevron pattern of the corrugations. It will be noted, however, that the straight path followed by infrared light generated in the final combustion zone 70 will be blocked from penetrating the catalyst zone 40 and causing "flashback". In other words, the zone 40 is opaque to light but highly permeable, desirably 70% to 92% open area, for the substantially free passage of gases therethrough.

The core of layered corrugated wire screen sheets, e.g., layers 64, 66, and 68 is retained within a retaining ring 72 (FIG. 4) of high temperature resistant material, e.g., 214 alloy steel or the like, and clamped to the combustor 32 by a suitable circumferential clamp 74 about the body of the combustor 22. The catalytic core 60 as shown in FIG. 4 is desirably accordion folded to fill the retaining ring 72.

Figure 5:
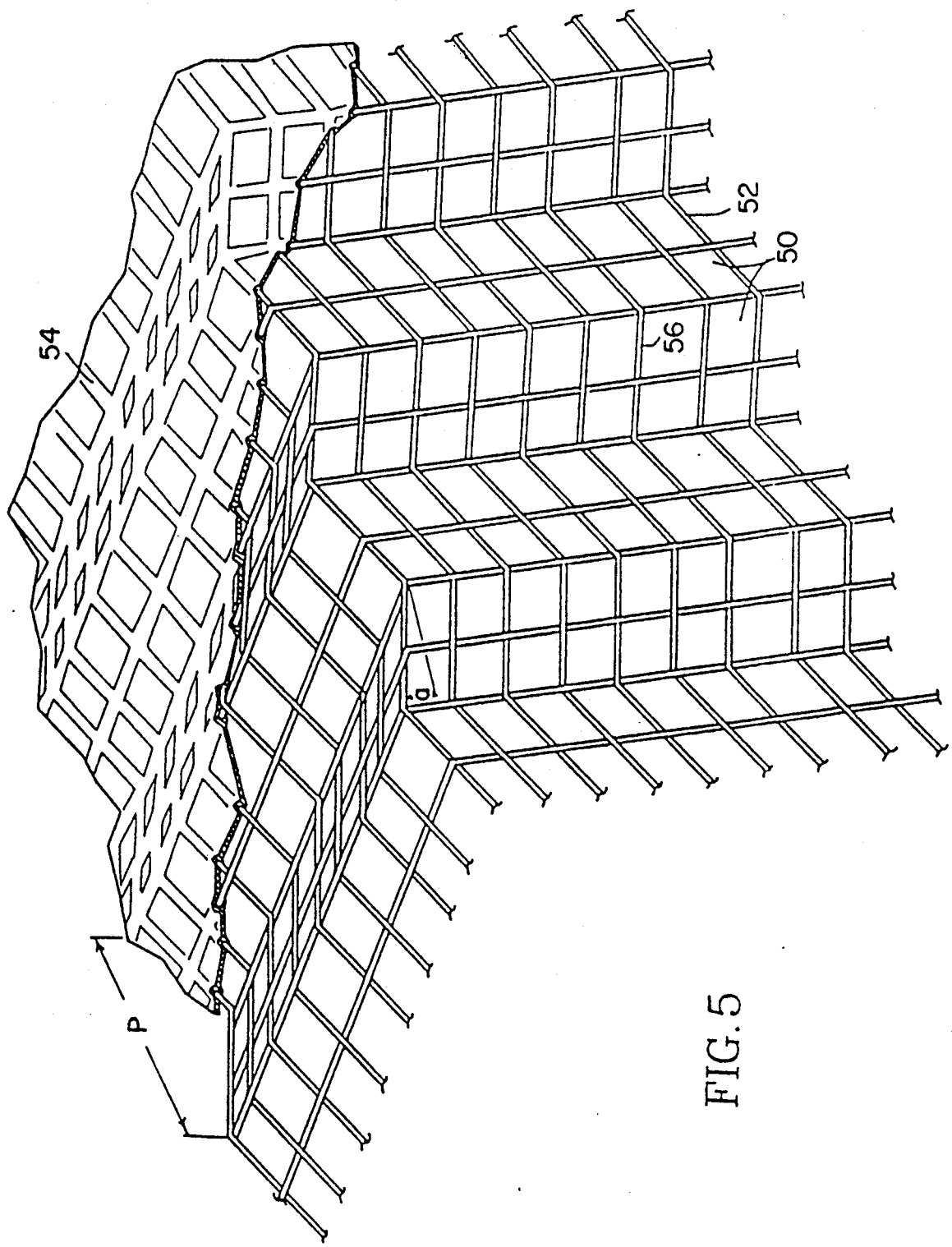
FIG. 5 shows in perspective and on an enlarged scale, a segment of corrugated wire mesh having a coating of a refractory metal oxide thereon for supporting a catalyst for use in the catalytic combustor zone such as shown in the apparatus of FIG. 2.

FIG. 5 shows a fragment of a corrugated screen partially coated with a refractory metal oxide. The wires, e.g., 52 and 56 are woven in a standard over-an-under weave and define meshes 50. The metal oxide coating 54 in the embodiment shown, blinds or fills the meshes 50. Although blinding of the screen is not necessary and the meshes 50 may be partially open. The pitch "p" of the corrugations is identified by the letter "p" and the altitude by the letter "a". The dimensions of these parameters are as given above. It should also be noted in FIG. 5 that the corrugations are in a chevron pattern or a herringbone pattern which is a well known configuration for foil strip catalytic supports. The present catalytic supports are screen instead of gas impermeable foil such as described in U.S. Pat. No. 4,711,009.

FIG. 6 is a diagrammatic and schematic flow sheet showing a process for treating a metallic screen, e.g., ferritic stainless steel coated with palladium or tungsten coated with palladium.

Figure 7:
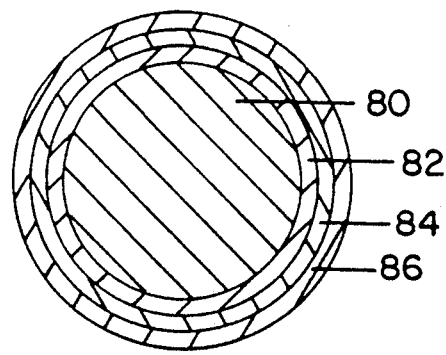
FIG. 7 is a cross-section view on a very much enlarged scale of a metal wire having the successive coatings described herein applied thereto, but without the catalyst.

FIG. 7 shows a cross-section of a wire such as used in forming a screen which is corrugated and treated in accordance with the process of FIG. 6. The cross-hatched inner circle 80 is a refractory metal, such as tungsten, or a high temperature resistant ferritic stainless steel alloy. It has a diameter of from about 0.002 to 0.005 inch. The next layer 82 is a nobel metal coating, such as palladium, having a thickness of from 0.00005 to 0.0001 inch thick. This may be applied by electroplating, diffusion coating, or the like. The extremely expensive noble metal may be alloyed with up to 20% by weight of silver. The next layer 84 is an aluminum coating, conveniently applied by diffusion coating, and with a thickness of from about 0.00005 to 0.0001 inch. The assembly to this point is then heated as above indicated to diffuse some of the aluminum into the body of the coated wire, and to convert the outermost portion of the aluminum to alumina, $Al_2O_3$. The outer most layer 86 is a ceramic or cermet coating which is conveniently plasma spray coated on the wire to a thickness of from 0.001 to 0.003 inch. This treatment provides a porous surface which is readily receptive to impregnating with an aqueous solution of a catalyst metal salt, which salt is converted to the metal by subsequent heat treatment, preferably in a reducing atmosphere. The wire screen or cloth is formed from the noble metal coated wire. The aluminum coating may be applied before or after weaving into the wire screen or cloth. Conversion to the aluminum oxide coating should be done after formation into the wire screen or cloth. The ceramic coating and the application of the catalyst is done on the finished wire screen or cloth.

There has thus been provided a highly efficient metal based catalytic combustor for a gas turbine/catalytic combustor assembly. The catalyst zone is formed of a high temperature resistant metal wire mesh, e.g. palladium coated tungsten wire screen, 20 to 200 mesh, which is aluminized with metallic aluminum, and heated to convert the outermost layer of aluminum to aluminum oxide and encourage the diffusion of the inner layer of aluminum into the body of the metal wire, desirably forming a thin metal/aluminum alloy layer. The outer surface because of the Kerkendall Effect is porous and readily accepts and strongly bonds to a metal oxide or ceramic coating, e.g., a magnesia/alumina, or magnesia/alumina/yttria, or barium oxide/alumina, or barium oxide/alumina/yttria coat. Preferably, there may also be included a catalyst deposited on the ceramic coat, e.g., a noble metal catalyst for aiding in the prevention or elimination of environmentally offensive materials. Because the metals from which the wire mesh is formed all have melting points above the maximum temperature of operation, i.e., 2700° F., the screen itself is durable. The ceramic coating resists spalling because of the aluminized and oxidized wire surface to which it is applied and because the coefficients of thermal expansion are similar. The particular ceramic coatings utilized herein are able to withstand the maximum temperatures generated within the catalyst zone for long periods of time making possible an operating life of about 8000 hours Ceramic monoliths, by comparison, have lasted only a few hours. Also, depending upon the amount of nitrogen contained within the fuel itself, the amount of $NO_x$ produced is well within the permissible EPA limits even for California (9 ppm). These catalytic combustors are able to withstand the severe vibrations generated in such devices without failure due to fatigue or spalling of the metal oxide coating. For these reasons, among others, the devices of the present invention are superior to the ceramic monolith devices of the prior art.

What is claimed is:

1. A catalytic combustor device for gas turbine power plants comprising a housing,
a primary fuel mixing zone, and
a catalytic combustor in axially spaced relation to said fuel mixing zone within said housing,
said catalytic combustor being characterized by a coated catalyst support member disposed in air/fuel intercepting relation in said fuel mixing zone within said housing,
said catalyst combustor comprising nonnesting layers of said coated catalyst support member which is nonlinearly corrugated and which is made of
a first layer composed of a high temperature resistant refractory metal or a ferritic stainless steel,
a second layer composed of a noble metal adhered to said first layer,
a third layer composed of a refractory metal oxide on said second layer, and
fourth layer composed of a catalytically active noble metal catalyst supported on said third layer,
said coated catalyst support member being in the form of a metal-ceramic honeycomb which is opaque to infrared.

2. A catalytic combustor having a housing, a fuel-air mixing zone, and a catalytic combustor zone in spaced relation within said housing, means for feeding fuel to said fuel-air mixing zone, means for feeding a fuel oxidant to said fuel-air mixing zone, said catalytic combustor zone characterized by a metallic honeycomb of a high temperature and oxidation resistant metal wire screen having coated thereon a noble metal layer, and an additional coating of a metal oxide which is impregnated thereon with a catalyst, said wire having a melting point of from about 2600° F. to about 6150° F., said screen having a wire diameter of from about 0.001" to about 0.01" and a mesh size of from about 15 to about 200 uniformly spaced wires per inch, said screen being corrugated to a pitch of from about 0.02" to about 0.2" and an amplitude of from about 0.05" to about 0.25", said metal oxide having a thickness of from about 0.0005" to about 0.003" and being strongly adhered to said wire, said honeycomb comprising a number of layers of such metal oxide coated corrugated wire screen dimensioned to fill the cross-section of said catalytic combustor zone and axially dimensioned sufficient to render said honeycomb opaque to infrared radiation and to provide a gas permeable open area of at least about 70%.

3. A catalytic combustor in accordance with claim 2 wherein the metal oxide is a refractory metal oxide.

4. A catalytic combustor in accordance with claim 3 wherein the refractory metal oxide comprises alumina.

5. A catalytic combustor in accordance with claim 3 wherein the refractory metal oxide comprises perovskite.

6. A catalytic combustor in accordance with claim 3 wherein the refractory metal oxide coated wire screen substrate is folded in a zig-zag manner back and forth upon itself to form a three dimensional core.

7. A catalytic combustor in accordance with claim 3 wherein the catalyst is a noble metal catalyst.

8. A catalytic combustor in accordance with claim 7 wherein the noble metal catalyst is palladium.

9. A catalytic combustor in accordance with claim 7 wherein the noble metal catalyst is platinum.

10. A catalytic combustor in accordance with claim 7 wherein the noble metal catalyst is rhodium.

* * * * *